United States Patent [19]

Sonoda et al.

[11] 4,402,021
[45] Aug. 30, 1983

[54] METHOD AND APPARATUS FOR RECORDING DIGITIZED INFORMATION ON A RECORD MEDIUM

[75] Inventors: Takenori Sonoda; Nobuhiko Watanabe; Masato Tanaka, all of Tokyo, Japan

[73] Assignee: Sony Corporation, Tokyo, Japan

[21] Appl. No.: 290,196

[22] Filed: Aug. 5, 1981

[30] Foreign Application Priority Data

Sep. 8, 1980 [JP] Japan .................................. 55-109663

[51] Int. Cl.³ .......................... G11B 15/18; G11B 5/09
[52] U.S. Cl. .................................... 360/72.2; 360/48; 360/49
[58] Field of Search ........................... 360/72.2, 49, 48

[56] References Cited

U.S. PATENT DOCUMENTS 4,167,759 9/1979 Tachi ................................. 360/72.2
4,237,499 12/1980 Taci ................................... 360/72.2

Primary Examiner—Vincent P. Canney

Attorney, Agent, or Firm—Lewis H. Eslinger; Alvin Sinderbrand

[57] ABSTRACT

At least one channel of digitized information is recorded in at least one data track on a record medium by forming data blocks, each containing a predetermined number of data words representing the digitized information, and recording successive data blocks in at least one data track. A block address also is generated to identify each of the respective data blocks, this block address also being recorded with the data block in the data track. A predetermined number of successive data blocks is recorded in the data track in a sector interval. A control signal having at least a sector address for identifying the sector interval also is generated, and this control signal is recorded in a separate control track, successive control signals being recorded in successive sector intervals. The least significant bit of the sector address is coincident with the most significant bit of the block address, such that the block address is repeated with a periodicity related to the sector interval. The combination of the sector and block addresses is used to access a desired one of the recorded data blocks.

24 Claims, 17 Drawing Figures

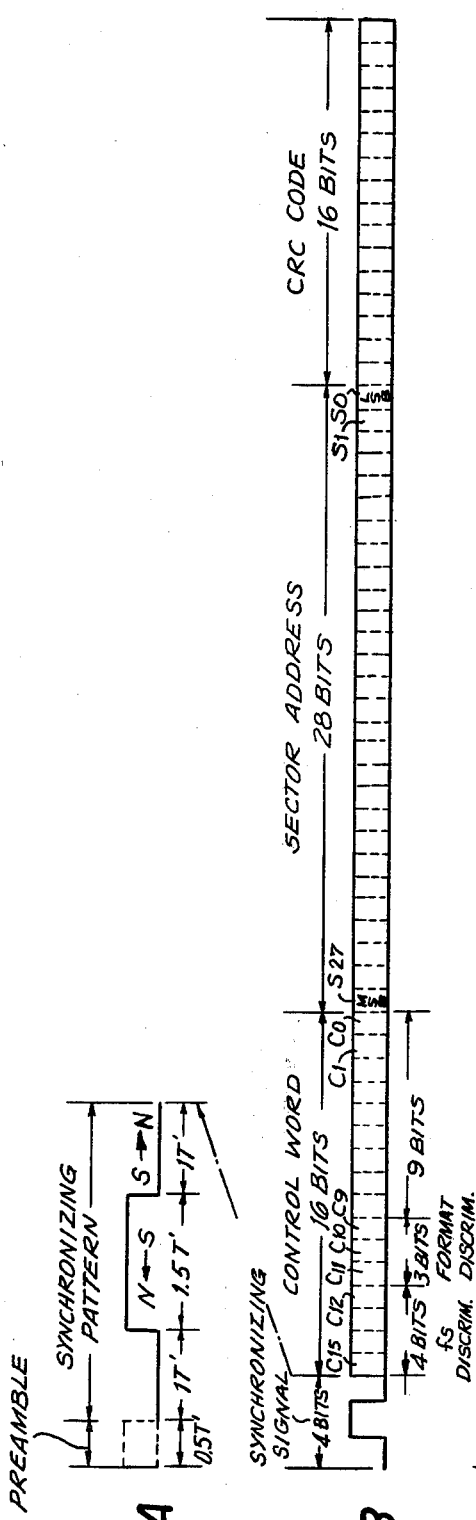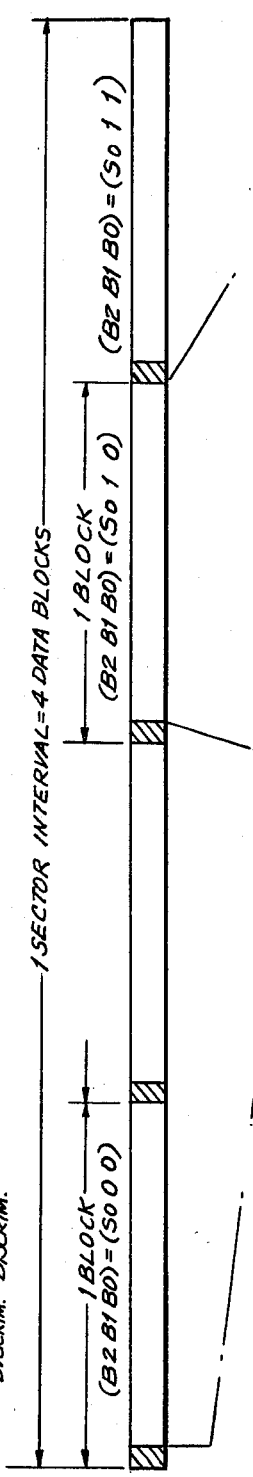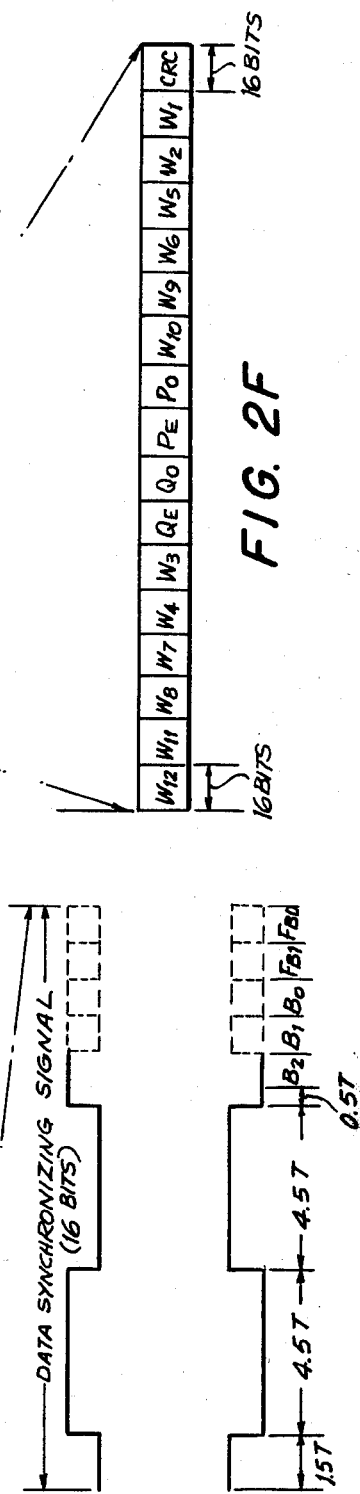

FIG. 3A

| DATA TRACK | DATA SEQUENCE | n | n+1 | n+2 | n+3 | n+4 | n+5 | n+6 | n+7 | n+8 | n+9 | n+10 | n+11 | n+12 | n+13 | n+14 | n+15 |
|---|---|---|---|---|---|---|---|---|---|---|---|---|---|---|---|---|---|
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | | | | | 4m+1 | | | | | | | |

| CONTROL TRACK (SECTOR ADDRESS) |
|---|
| 4m+0    4m+1    4m+2    4m+3 |

FIG. 3B

| | | n | n+2 | n+4 | n+6 | n+8 | n+10 | n+12 | n+14 | n+16 | n+18 | n+20 | n+22 | n+24 | n+26 | n+28 | n+30 |
|---|---|---|---|---|---|---|---|---|---|---|---|---|---|---|---|---|---|
| DATA TRACK A | DATA SEQUENCE | | | | | | | | | | | | | | | | |
| | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+3 | n+5 | n+7 | n+9 | n+11 | n+13 | n+15 | n+17 | n+19 | n+21 | n+23 | n+25 | n+27 | n+29 | n+31 |
| | BLOCK ADDRESS | 0 | 1 | 2 | 3 | 4 | 5 | 6 | 7 | 0 | 1 | 2 | 3 | 4 | 5 | 6 | 7 |

CONTROL TRACK (SECTOR ADDRESS): 4m+0, 4m+1, 4m+2, 4m+3

FIG. 3C

| | | n | n+4 | n+8 | n+12 | n+16 | n+20 | n+24 | n+28 | n+32 | n+36 | n+40 | n+44 | n+48 | n+52 | n+56 | n+60 |
|---|---|---|---|---|---|---|---|---|---|---|---|---|---|---|---|---|---|
| DATA TRACK A | DATA SEQUENCE | | | | | | | | | | | | | | | | |
| | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+5 | n+9 | n+13 | n+17 | n+21 | n+25 | n+29 | n+33 | n+37 | n+41 | n+45 | n+49 | n+53 | n+57 | n+61 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK C | DATA SEQUENCE | n+2 | n+6 | n+10 | n+14 | n+18 | n+22 | n+26 | n+30 | n+34 | n+38 | n+42 | n+46 | n+50 | n+54 | n+58 | n+62 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK D | DATA SEQUENCE | n+3 | n+7 | n+11 | n+15 | n+19 | n+23 | n+27 | n+31 | n+35 | n+39 | n+43 | n+47 | n+51 | n+55 | n+59 | n+63 |
| | BLOCK ADDRESS | 0 | 1 | 2 | 3 | 4 | 5 | 6 | 7 | 0 | 1 | 2 | 3 | 4 | 5 | 6 | 7 |

CONTROL TRACK (SECTOR ADDRESS): 4m+0, 4m+1, 4m+2, 4m+3

FIG.4
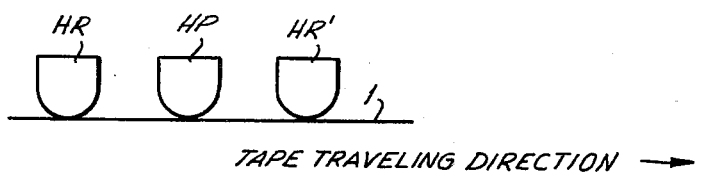
TAPE TRAVELING DIRECTION →
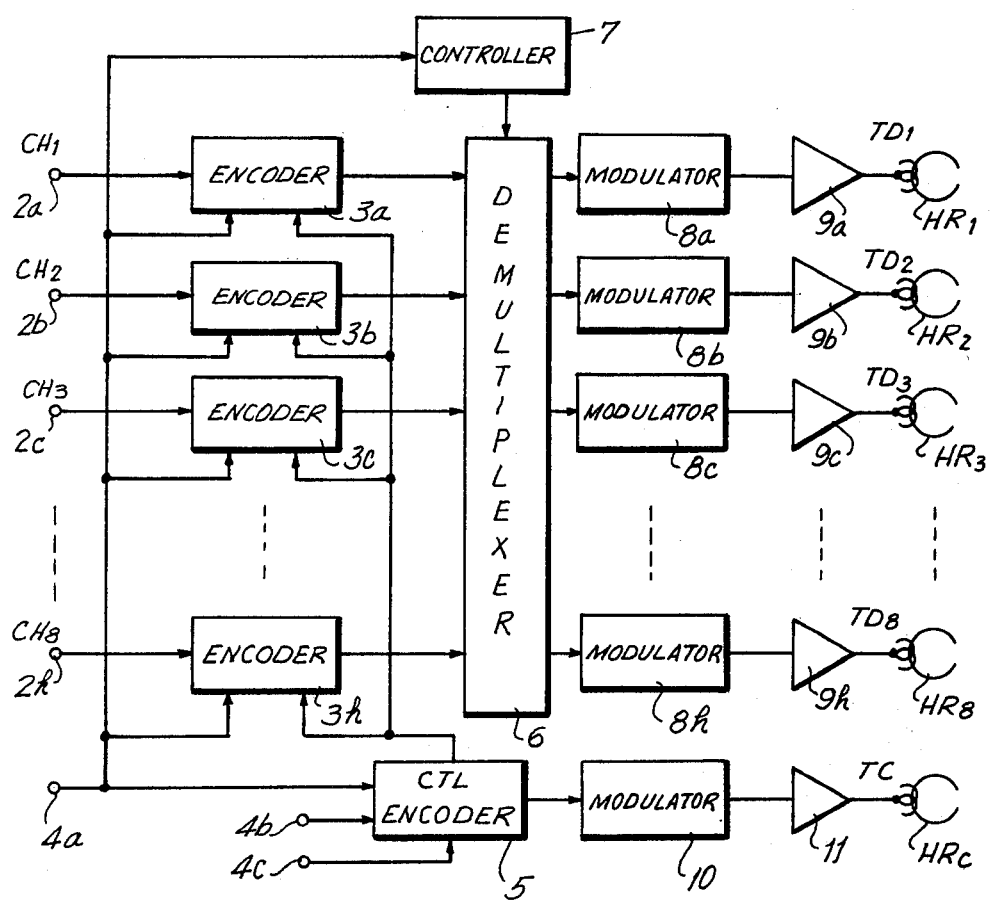
FIG.5

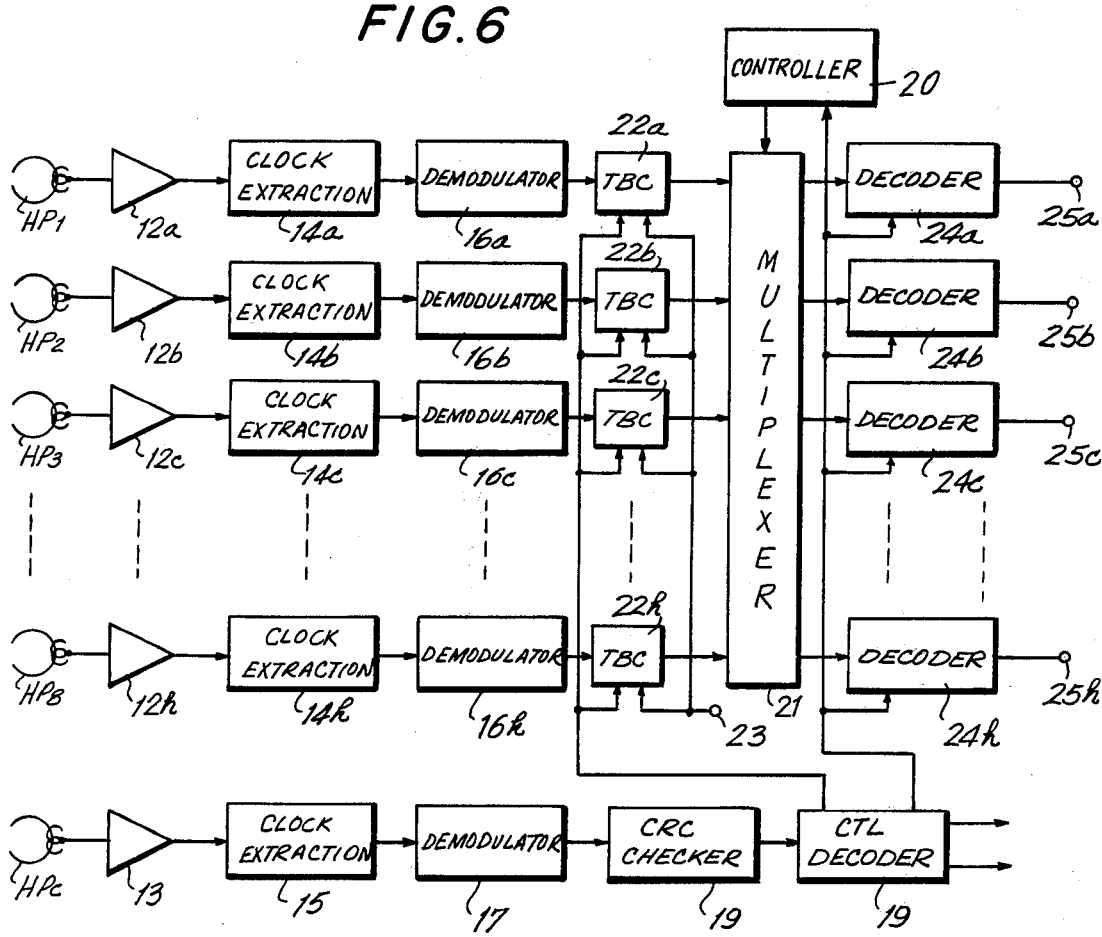
FIG. 6
FIG. 7A  (So)
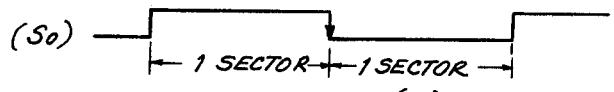
FIG. 7B  (B₂)
FIG. 7C  (B'₂)
FIG. 7D  (B''₂)

METHOD AND APPARATUS FOR RECORDING DIGITIZED INFORMATION ON A RECORD MEDIUM

BACKGROUND OF THE INVENTION

This invention relates to a method and apparatus for recording channels of digitized information in data tracks on a record medium and, more particularly, to such a method and apparatus wherein the digitized information is recorded in successive data blocks in at least one and, preferably, in a plurality, of data tracks, each recorded data block being separately accessible.

Digital recording techniques have been extended to various fields in which analog recording heretofore had been used. For example, high quality audio recording now can be achieved by using digital techniques. So-called PCM recorders have been proposed for recording audio signals in digital form on a suitable magnetic record medium, such as magnetic tape. U.S. Pat. Nos. 4,211,997 and 4,145,683 describe two of these digital audio recording techniques.

Typically, digital signals are recorded in various error-correction codes so as to prevent total loss of information in the event of noise, interference, dropout, and other disturbances which may obliterate a portion of the recorded data. One recent error correcting code which has been developed and which is particularly useful in recovering digitally encoded signals that may be subjected to such obliteration is the so-called cross-interleave error correction code described in, for example, U.S. application Ser. No. 218,256, filed Dec. 19, 1980. Other error-correction encoding techniques also are known, such as described in U.S. Ser. No. 195,625, filed Oct. 9, 1980. In such useful error correction codes, a number of digital words, each representing, for example, a sample of an analog signal, are grouped in data blocks. Advantageously, and as described in the aforementioned applications, such data blocks are formed of time-interleaved digital words, together with time-interleaved parity words, the latter being used, upon reproduction and time de-interleaving, to correct for errors that may be present in the digital words. The data blocks in which the aforementioned time-interleaved digital words are grouped are recorded in one or more data tracks on the record medium.

When data blocks are recorded, as aforesaid, in a PCM audio recorder, a predetermined synchronizing signal may be inserted into every recorded data block, this synchronizing signal being used, during reproduction, by a servo system to control a tape-drive capstan such that the digital signals are reproduced with proper timing relationships. Such synchronizing signals thus are reproduced with a period equal to the data block period. Typically, such reproduced synchronizing signals exhibit a relatively high repetition rate, particularly if the length, or duration, of the data block is relatively short. Such a short data block duration is advantageous in many error-correction decoding schemes. However, a relatively rapid repetition rate of this synchronizing signal which is used for carrying out a capstan servo operation places severe constraints on the tolerance of the servo system to account for jitter, timing errors due to expansion of the record medium, and the like.

PCM audio recorders offer the advantage that highly precise electronic editing may be performed. For example, in a data track, a data block, which represents a relatively small increment of audio information, may be accessed, and that data block, as well as numerous succeeding data blocks, then may be modified, replaced, or the like. The location at which this electronic editing commences is known as the "punch-in" point, and the location at which this editing terminates is known as the "punch-out" point. Of course, for optimum editing, the punch-in and punch-out points should be known with high accuracy. This can be achieved by identifying the particular data blocks which are located at the punch-in and punch-out points. Such data block identification, or access, may be obtained by providing a data block address at the beginning of each recorded data block. However, to avoid ambiguity, since a very large number of data blocks may be recorded in a data track, the data block address must be formed of a large number of bits. Consequently, the data block address may become unreasonably enlarged. For this reason, the use of a data block address at the beginning of each data block has not been enthusiastically adopted. Consequently, if a data block address is provided at the beginning of, for example, a group of ten data blocks, thereby permitting the data block address to include a smaller number of bits, the punch-in and punch-out points cannot be selected with as great a precision as would otherwise obtain if the data block address is provided in each data block.

OBJECTS OF THE INVENTION

Therefore, it is an object of the present invention to provide an improved method and apparatus for recording digitized information in the form of data blocks, which overcomes the aforenoted disadvantages and defects.

Another object of this invention is to provide an improved method and apparatus for recording at least one channel of digitized information in at least one data track on a record medium, wherein the digitized information is recorded in individually identifiable and accessible data blocks.

A further object of this invention is to provide an improved method and apparatus for recording digitized information, as aforesaid, wherein a synchronizing signal is recorded and subsequently reproduced for the purpose of servo control, the repetition rate of the reproduced synchronizing signal being sufficiently low in order to provide a greater range of tolerance for mechanical jitter, expansion of the record medium, and the like.

An additional object of this invention is to provide a method and apparatus for recording digitized information in at least one data track, wherein a separate control track also is recorded, the control track having a control signal recorded therein, which control signal includes at least a synchronizing signal which may be used, upon reproduction, for servo control, and a sector address which is used to identify the digitized information recorded in the data tracks.

A still further object of this invention is to provide a method and apparatus for recording at least one channel of digitized information in the form of data blocks in at least one data track on a record medium, each data block having a block address for identifying respective data blocks that are recorded in a sector interval, and wherein a control signal is recorded on a separate control track, the control signal including the sector address for identifying successive sector intervals, each sector interval having a multiple of data blocks recorded therein, wherein the combination of the sector and block addresses is used to identify, or access, individual data blocks.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus for recording at least one channel of digitized information in at least one data track on a record medium are provided. Stated in general terms, n channels of digitized information are recorded in m data tracks, wherein each channel is recorded in m/n data tracks, with $m \geq n$, and m and n are integers. The digitized information is encoded to form data blocks, each data block containing a predetermined number of data words representing the digitized information, the data blocks being distributed to respective ones of the data tracks for recording therein. Each data block also is provided with a block address which identifies that data block. Successive data blocks, including the respective block addresses, are recorded in each of the data tracks. A periodic control signal also is generated during successive sector intervals, the periodic control signal including at least a synchronizing signal and a sector address. The control signal is recorded in a control track, each of the successive control signals being recorded in a respective sector interval. A multiple of data blocks is recorded in a given data track during each sector interval.

In accordance with one aspect of the present invention, the block address is comprised of a plurality of bits and the sector address is comprised of a larger number of bits, with the least significant bit of the sector address being coincident, i.e., being of the same logical sense, with the most significant bit of the block address.

In accordance with another aspect of this invention, the respective block addresses are generated by incrementing the present block address for each data block to be recorded in a data track, with the block addresses being repeated after a predetermined number of sector intervals have been recorded. The sector address is incremented for each control signal that is recorded, thereby providing substantially non-repeating sector addresses which may be recorded over the entire length of the record medium.

It is one feature of the present invention to record one channel of digitized information in plural data tracks by distributing the data blocks of that channel to such plural data tracks, with each data track containing a multiple of data blocks during each sector interval. In this arrangement, each data block that is recorded in the same relative position in a sector interval in each of the plural data tracks exhibits the same block address.

A preferred use of the present invention is to record digitized audio signals, such as PCM audio signals.

BRIEF DESCRIPTION OF THE DRAWINGS

The following detailed description, given by way of example, will be best understood in conjunction with the accompanying drawings in which:

FIGS. 2A–2F are timing diagrams representing the various signals that are recorded in the data and control tracks of the record medium in accordance with the present invention;

FIGS. 3A–3C are tables which are helpful in understanding the relationship among the different formats with which the present invention can be used;

FIG. 4 is a schematic diagram representing the arrangement of recording and playback transducers which may be used, with the advantages derived from the present invention, in carrying out an edit operation;

FIG. 5 is a block diagram of one embodiment of the recording section in which the present invention is used;

FIG. 6 is a block diagram of one embodiment of the reproducing section in which the present invention finds ready application; and FIGS. 7A–7D are timing diagrams which are useful in understanding one advantage of the present invention.

DETAILED DESCRIPTION OF CERTAIN PREFERRED EMBODIMENTS

Figure 1:
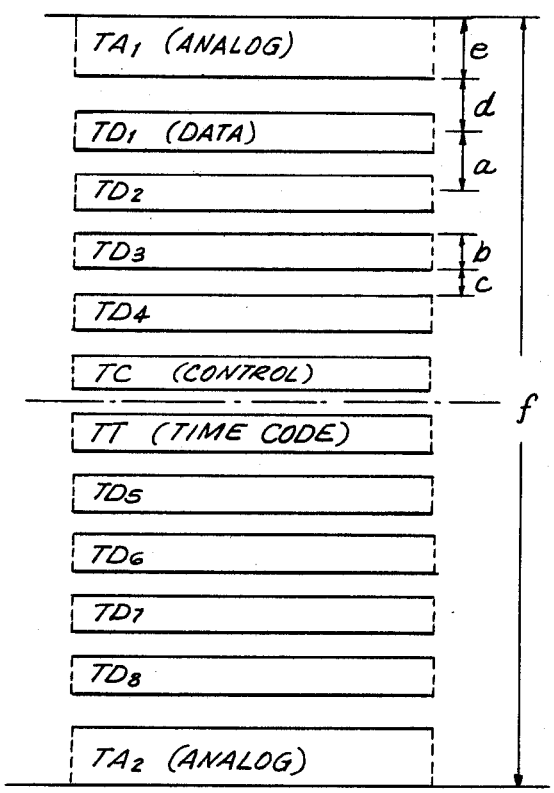
FIG. 1 is a schematic diagram representing one example of track patterns which are produced in accordance with the present invention.

Referring now to the drawings, and in particular to FIG. 1, there is illustrated one example of magnetic tape track configurations with which the present invention can be used. It should be readily appreciated from the forthcoming description that this invention can be used to record digitized information on various different types of record media, such as magnetic tape, magnetic disc, magnetic sheet, optical disc, and the like. For the purpose of the present description, it is assumed that the digitized information is recorded on magnetic tape. It is further assumed that this magnetic tape moves with respect to fixed recording and reproducing transducers. Preferably, the recording transducers, or heads, are arranged in an assembly so as to record plural tracks concurrently. These tracks are illustrated in FIG. 1 as being recorded on magnetic tape 1 of, for example, ¼ inch width. Although not shown herein, in other examples the tracks may be recorded on magnetic tape of one-half inch width, and the tracks also may be recorded on magnetic tape of one inch width. As illustrated, the respective tracks are parallel with each other and extend in the longitudinal direction along the magnetic tape.

In FIG. 1, tape 1 is illustrated as having marginal tracks $TA_1$ and $TA_2$ adjacent the opposite edges thereof. These marginal tracks are adapted to have analog signals recorded therein. For example, when tape 1 is used to record digital audio signals, analog tracks $TA_1$ and $TA_2$ are used to record analog audio signals. These analog audio signals are useful in locating desired portions of the magnetic tape for use in editing operations, such as so-called splice editing or electronic editing.

Magnetic tape 1 is illustrated as having a center line on either side of which are provided tracks TC and TT. Track TC is a control track adapted to have a control signal recorded therein. This control signal is illustrated in greater detail in FIG. 2B. Track TT is adapted to have a time code recorded therein.

Data tracks $TD_1$, $TD_2$, $TD_3$ and $TD_4$ are disposed, or sandwiched, between analog tracks $TA_1$ and control track TC. Similarly, data tracks $TD_5$, $TD_6$, $TD_7$ and $TD_8$ are disposed, or sandwiched, between time code track TT and analog track $TA_2$. It will be appreciated that the digitized information is recorded in each of the data tracks TD. In the illustrated example of ¼ inch tape, the digitized information may be recorded in any one of different formats. As an example, and for the purpose of illustration, three separate formats are described herein, these formats being referred to as format A, format B and format C, respectively. As one example thereof, digitized information is recorded in format A in one track per channel. That is, if eight channels of digitized information are provided, these eight channels are recorded in data tracks $TD_1$–$TD_8$, respectively. In format B, the digitized information is recorded in two tracks per channel. That is, since eight data tracks are provided, a total of four channels may be recorded, wherein channel 1 is recorded in tracks $TD_1$ and $TD_5$, channel 2 is recorded in tracks $TD_2$ and $TD_6$, and so on. In format C, the digitized information is recorded in four tracks per channel. Thus, with the eight data track illustrated in FIG. 1, a total of two channels may be recorded, wherein digital signals from channel 1 are recorded in tracks $TD_1$, $TD_3$, $TD_5$ and $TD_7$, and digital signals from channel 2 are recorded in tracks $TD_2$, $TD_4$, $TD_6$ and $TD_8$. The particular manner in which the digital signals are recorded in the respective tracks is described in greater detail hereinbelow.

In FIG. 1, the following representations are used for the indicated dimensions:
 a = data track pitch;
 b = data track width;
 c = guard band width separating adjacent data tracks;
 d = clearance between adjacent analog and data tracks from the edge of the analog track to the center of the adjacent data track;
 e = analog track width; and
 f = tape width.
A numerical example of the foregoing dimensions follows:
 a = 480 μm (microns)
 b = 280 to 380 μm
 c = 200 to 100 μm
 d = 540 μm
 e = 445 μm
 f = 6.30 mm$_{-20}{}^{+0}$ μm It may be appreciated that, when format A is used such that one track per channel is used for recording, the magnetic tape is advanced at a speed referred to herein as its highest speed. When format B is used such that two tracks per channel are employed for recording, the tape speed may be reduced by half, and this lesser speed is referred to as the medium speed. When format C is used such that four tracks per channel are utilized for recording, the tape speed may be reduced by one-half again, and this is referred to as the slowest tape speed. A numerical example for tape 1, having ¼ inch width, is as follows:

|  | Format A | Format B | Format C |
| --- | --- | --- | --- |
| Number of channels | 8 | 4 | 2 |
| Number of tracks per channel | 1 | 2 | 4 |
| Tape speed (cm/sec) | 76.00 | 38.00 | 19.00 |

It is appreciated that, when more tracks per channel are used, the tape speed may be reduced, thereby reducing tape consumption and enabling so-called long-playing tapes. However, as tape consumption is reduced, thereby increasing the playing time, the number of channels which may be recorded likewise is reduced.

In the foregoing table, the digitized information recorded in the respective data tracks is derived from analog signals, these analog signals being sampled at a predetermined sampling rate and each sample being converted to digital form. As a numerical example, the sampling rate $f_s$ which is used to produce the digitized information is on the order of 50.4 kHz. Other sampling frequencies $f_s$ may be used. It is appreciated that, if lower sampling frequencies are employed, the speed at which the tape is driven for recording the digitized information in their respective formats likewise may be reduced. Thus, for a sampling frequency $f_s$ on the order of about 44.1 kHz, the tape speed for tape 1 recording in format A may be on the order of about 66.5 cm/sec. For the sampling frequency $f_s$ on the order of about 32.0 kHz, the tape speed for the tape recording in format A is on the order of about 48.25 cm/sec. Of course, the foregoing tape speeds are halved when format B is adapted, and these tape speeds are halved again when format C is adopted.

Turning now to FIGS. 2A–2F, there are illustrated a typical example of the control signal that is recorded in control track TC and a typical example of the digitized information that is recorded in a typical data track TD. FIG. 2B is a timing diagram representing the control signal; and FIGS. 2C–2F, in combination, are timing diagrams representative of the digitized information.

The control signal having the timing representation shown in FIG. 2B is recorded in control track TC for all formats. This control signal is comprised of a synchronizing signal positioned at the head, or beginning portion thereof, followed by a 16-bit control word formed of control data bits $C_0$–$C_{15}$, followed by a 28-bit sector address formed of address bits $S_0$–$S_{27}$, followed by a 16-bit error detecting code word, such as the cyclic redundancy code (CRC) word. Although the control signal shown in FIG. 2B is comprised of predetermined segments each formed of a preselected number of bits, it will be appreciated that, if desired, other segments may be used; and each of the illustrated segments may be formed of any desired number of bits capable of representing control data, sector addresses and error detecting codes. Furthermore, if desired, the synchronizing signal may be positioned at any other predetermined location in the control signal.

The term "sector" or "sector interval", as used herein, refers to a predetermined time interval which corresponds to a predetermined recording length, or interval, on the record medium. The sector interval is defined by the control signal illustrated in FIG. 2B. Successive control signals are recorded in successive, abutting sector intervals. As each control signal is recorded in a sector interval, the sector address is incremented by unity (i.e. by one bit). Hence, the sector address serves to identify the particular sector interval in which the control signal is recorded. The desired sector interval may be accessed merely by addressing the corresponding sector address. It is appreciated that $2^{28}$ successive sector intervals may be recorded on, for example, a length of magnetic tape; and the corresponding sector addresses will be incremented from one sector interval to the next so as to appear as, for example, [000 . . . 000], [000 . . . 001], [000 . . . 010], [000 . . . 011], and so on. As will be explained below, digitized information is recorded in the respective data tracks TD during each of the successive sector intervals.

The synchronizing signal which precedes the control word is illustrated with an expanded time scale in FIG. 2A. The synchronizing signal occupies a duration equal to four control signal bit cells, wherein a bit cell is equal to the interval occupied by a respective bit of the control word, the sector address and the CRC code. The synchronizing signal is seen to exhibit a predetermined, constant synchronizing pattern preceded by a "preamble". The purpose of the preamble is to accommodate the last, or least significant bit of the CRC code, included in the immediately preceding control signal, so as to ensure that the synchronizing pattern will appear as illustrated. For example, if the last bit of the preceding control signal is a binary "1", which exhibits a relatively higher level, the preamble of the immediately-following synchronizing signal also is at a relatively higher binary "1" level for a duration equal to 0.5T' (where T' is equal to the bit cell duration of a control signal bit). Conversely, if the last bit of the immediately preceding control signal is a binary "0", which is represented by a relatively lower level signal, the preamble of the next-following synchronizing signal also is equal to a relatively lower binary "0" level for this duration 0.5T'. Hence, the preamble is seen to exhibit either a first or a second logical sense depending upon the state of the last bit of the immediately preceding control signal.

The synchronizing pattern which is included in the synchronizing signal and which follows the preamble exhibits a positive-going transition at a period 1T' following the preamble, and then exhibits an opposite, negative-going transiation at a period 1.5T' following the first-mentioned positive-going transition. The synchronizing signal ends, and the control word commences, at a period 1T' following this second, negative-going transition. This particular synchronizing pattern is advantageous in that it is distinct from any bit pattern included in the control word, sector address or CRC code of the control signal. Hence, this synchronizing pattern may be readily detected during a reproducing operation so as to identify the beginning of successive sector intervals. Also, this synchronizing pattern, when detected, may be used to synchronize the detection of the control word, sector address and CRC code of the control signal, and also may be used in a servo control circuit for controlling the tape drive during a reproducing operation. When the present invention is used with a magnetic recording medium, the transitions in the recorded signal, such as the illustrated transitions which comprise the synchronizing pattern, represent magnetic vectors.

The control word is adapted to represent control data for the purpose of identifying the particular format that is used to record the digitized information. For example, control bits $C_{12}$-$C_{15}$ may represent the sampling rate that has been used to digitize the analog signal, resulting in the digitized information that is recorded. Alternatively, since the speed at which the record medium is driven is related to the sampling rate, control bits $C_{12}$-$C_{15}$ may represent this tape speed. As an example, for the three representative sampling rates mentioned above, control bits $C_{12}$-$C_{15}$, which are referred to herein as the sampling rate identification signal may be as follows:

| Sampling Rate Identification Signal | | | | Sampling Rate (kHz) |
| --- | --- | --- | --- | --- |
| $C_{15}$ | $C_{14}$ | $C_{13}$ | $C_{12}$ | $f_s$ |
| 0 | 0 | 0 | 0 | 50.4 |
| 0 | 0 | 0 | 1 | 44.1 |
| 0 | 0 | 1 | 0 | 32.0 |

It is seen that, if desired, up to sixteen different sampling rates may be accommodated by the sampling rate identification signal ($C_{12}$-$C_{15}$).

Control bits $C_9$-$C_{11}$ represent the number of tracks per channel in which each channel of digitized information is recorded. From the description set out hereinabove, it is recalled that in format A, each channel of digitized information is recorded in a respective data track. In format B, each channel of digitized information is recorded in two separate data tracks. In format C, each channel of digitized information is recorded in four separate data tracks. The number of tracks per channel may be represented by control bits $C_9$-$C_{11}$ as follows:

| $C_{11}$ | $C_{10}$ | $C_9$ | Tracks/Channel | Format |
| --- | --- | --- | --- | --- |
| 0 | 0 | 0 | 1 | A |
| 0 | 0 | 1 | 2 | B |
| 0 | 1 | 0 | 4 | C |

It is appreciated that a total of eight different format characteristics, including the number of tracks per channel, may be represented by the 3-bit code $C_9$-$C_{11}$. For purposes of illustration, and in the interest of simplification and brevity, only three such characteristics (i.e. tracks per channel) are illustrated.

Control bits $C_0$-$C_8$ are used to represent other elements which constitute respective formats. For example, different encoding schemes may be used to encode the digitized information. Such encoding schemes include the aforementioned cross-interleave code. Modifications of the cross-interleave code also may be used, as desired. Furthermore, an encoding scheme which is adapted to minimize distortion due to the DC component of the digital signals recorded on the record medium also may be used, such as described in U.S. Ser. No. 201,781, filed Oct. 29, 1980, the disclosure thereof being incorporated herein by reference. Other examples of interleaved error correction encoding techniques are described in, for example, U.S. Ser. No. 218,256, filed Dec. 19, 1980, Ser. No. 195,625 filed Oct. 9, 1980, Ser. No. 230,395, filed Feb. 2, 1981 and Ser. No. 237,487, filed Feb. 23, 1981, the disclosures of which being incorporated herein by reference.

In addition to being encoded in a desired encoding scheme, which encoding scheme is represented by selected ones of data bits $C_0$-$C_9$, the encoded digitized information also may be modulated prior to recording. One example of a type of modulation that may be used is described in application Ser. No. 222,278, filed Jan. 2, 1981, the disclosure of which is incorporated herein by reference. In this modulator, the encoded digital signals are modulated so as to establish strict limitations on the minimum and maximum intervals between successive transitions, thereby avoiding distortion when the digitized signals are reproduced. Of course, other types of modulation may be used, such as the so-called 3PM type, or MFM type, or bi-phase modulation, as desired. The particular type of modulation which is used is represented by selected ones of control bits $C_0$-$C_9$.

Thus, it is appreciated that the control data comprised of bits $C_0$-$C_{15}$ represent the particular format which is used to sample, encode, modulate and record the input information.

The sector address comprised of bits $S_0$-$S_{27}$ may be generated by, for example, a typical counter that is incremented in synchronism with the processing and recording of each sector interval. Preferably, the control data and the sector address data are held to produce an appropriate CRC code, or other error detecting code, from which the presence of an error in the control word and/or sector address may be detected upon reproduction. The formation of a CRC code and the manner in which it is used are known to those of ordinary skill in the art and, in the interest of brevity, further description thereof is not provided.

As will be described below, the control signal illustrated in FIG. 2B is subjected to FM modulation, and the FM-modulated control signal then is recorded in control track TC. Thus, regardless of the particular format which is used to record the digitized information, the FM-modulated control signal described hereinabove is common to such different formats.

FIG. 2C is a representative timing diagram illustrating the manner in which digitized information is recorded in a respective data track TD. For simplification, reference is made initially to the recording of digitized information in one track per channel. In accordance with the aforementioned cross-interleave error correction encoding techniques, successive samples of an input analog signal, such as an audio signal, are converted to corresponding digital information words, and these digital information words are used to produce error-correction words, such as parity words P. Then, a predetermined number of information words and parity words are time-interleaved to form sub-blocks, and a further error-correction word, such as a Q-parity word, is derived from the time-interleaved sub-block. Odd and even information words and their respective P-parity and Q-parity words are cross-interleaved to form a data block comprising, for example, twelve information words, four parity words and an error-detection word, such as a CRC code word, derived therefrom. A respective data block is preceded by a data synchronizing signal and, as illustrated in FIG. 2C, four successive data blocks are recorded in a sector interval. Of course, the data blocks may be modulated prior to recording, as described above.

When format A is used, wherein the digitized information is recorded in one track per channel, successive data blocks are recorded in seriatum in a corresponding data track TD. When the digitized information is recorded in format B, wherein two tracks per channel are used, each of these two data tracks is provided with successive data blocks as shown in FIG. 2C. However, such recorded data blocks need not necessarily be sequential blocks. For example, the first data block may be recorded in block position #1 in a first of the two tracks, and the second data block may be recorded in block position #1 in the second data track. Then, the third data block may be recorded in block position #2 in the first track and the fourth data block may be recorded in block position #2 in the second data track. This distribution of data blocks may continue such that, for example, in the first data track, data blocks 1, 3, 5, 7 and so on are recorded; and in the second data track, data blocks 2, 4, 6, 8 and so on are recorded.

If format C is selected, wherein four tracks per channel are used for recording, the first data block is recorded in block position #1 of a first data track, the second data block is recorded in block position #1 of a second data track, the third data block is recorded in block position #1 of a third data track, and the fourth data block is recorded in block position #1 of the fourth data track. Then, the fifth data block is recorded in block position #2 of the first data track, the sixth data block is recorded in block position #2 of the second data track, the seventh data block is recorded in block position #2 of the third data track and the eighth data block is recorded in block position #2 of the fourth data track. Hence, the first data track has recorded therein the data blocks of sequence 1, 5, 9, 13, and so on; the second data track has recorded therein the sequence of data blocks 2, 6, 10, 14, and so on; the third data track has recorded therein the sequence of data blocks 3, 7, 11, 15 and so on; and the fourth data track has recorded therein the sequence of data blocks 4, 8, 12, 16 and so on.

Nevertheless, regardless of the particular format, or number of tracks per channel which is used, each data track has succeeding data blocks recorded therein in the manner shown in FIG. 2C. Thus, during each sector interval, four succeeding data blocks are recorded, each data block being preceded by a data synchronizing signal. Advantageously, the control signal recording head is in proper alignment with the information signal recording heads such that all of the data tracks are in alignment across the width of the magnetic medium, that is, all of the data synchronizing signals are in alignment, and the information signals also are in alignment with the control signal recorded in control track TC. That is, the synchronizing signal which is recorded at the head of the control signal is in alignment with the data synchronizing signals of each of the first data blocks recorded in a particular sector interval. Alternatively, the control signal recording head may be displaced from the information signal recording heads by a distance equal to an integral multiple of a sector interval.

The data synchronizing signal which precedes each data block (shown by the cross-hatched areas in FIG. 2C) is illustrated with an expanded time scale in FIGS. 2D and 2E. The data synchronizing signal occupies an interval corresponding to sixteen data bit cells, wherein each data bit cell is equal to the duration of the recorded data bit. It should be appreciated that the duration of a data bit cell T is much smaller than the duration of a control bit cell T', for example, T'=18T. The data synchronizing signal includes a synchronizing pattern comprised of a first transition which occurs at an interval 1.5T following the beginning of the data synchronizing signal, a second transition which occurs at an interval 4.5T following the first transition, and a third transition which occurs at an interval 4.5T following the second transition. Since the data synchronizing signal of one data block follows immediately after the last bit of the preceding data block, the synchronizing pattern may exhibit the waveform shown either in FIG. 2D or 2E, depending upon the logic signal level of the final bit of the preceding data block.

The data synchronizing pattern is selected to be unique in that this pattern will not be exhibited by the information data included in the respective data blocks, even after modulation. For example, if the modulation described in U.S. Ser. No. 222,278 is adopted, transitions between data bits of the modulated digitized information are prohibited from exhibiting the pattern shown in FIGS. 2D and 2E. Consequently, the data synchronizing signal may be readily detected upon reproduction and used, for example, to restore timing, to detect the beginning of a data block, to synchronize the demodulation and decoding of the digitized information, and the like.

The data synchronizing pattern is followed, after a delay interval of 0.5T, by a block address comprised of bits $B_0-B_2$ which, in turn, is followed by flag bits $FB_1$ and $FB_0$. The block address $[B_2B_1B_0]$ identifies the particular block position in which the data block is recorded. Preferably, the most significant bit $B_2$ of the block address is made equal to the least significant bit $S_0$ of the sector address of the particular sector in which the data block is recorded. If the block address is comprised of, for example, four bits, then the two most significant bits thereof may be made equal to the two least significant bits $S_1S_0$ of the sector address. With the block address comprised of three bits, it is appreciated that eight separate block positions may be represented thereby. Since four data blocks are recorded in a sector interval, and since the most significant block address bit $B_2$ is made equal to the least significant sector address bit $S_0$, it is appreciated that the block address $[B_2B_1B_0]$ is repeated every two sector intervals, but that portion of the block address $[B_1B_0]$ is repeated at every sector interval. That is, eight separate block positions are recorded during every two sector intervals. If the most significant block address bit $B_2$ is equal to a binary "1", as determined by the least significant sector address bit $S_0$, then the data synchronizing signal shown in FIG. 2D is recorded. Alternatively, if the most significant block address bit $B_2$ is equal to a binary "0", then the data synchronizing signal illustrated in FIG. 2E is recorded.

Flag bits $FB_1$ and $FB_0$ are used, in the preferred embodiment of the present invention, as an emphasis identification signal. Preferably, when the present invention is used to record digital audio signals, the original analog audio signals are selectively subjected to emphasis prior to being digitized. If such analog signals are emphasized, that is, if a conventional emphasis circuit is actuated or "turned on", then the emphasis identification signal represents that the analog signal had been emphasized. For example, $[FB_1FB_0]=[01]$. Alternatively, if the input analog signals had not been emphasized, then the emphasis identification signal may be represented as $[FB_1FB_0]=[00]$.

Typically, emphasis will occur over a sufficient duration such that all of the digitized signals from a particular channel which are recorded in two sector intervals will be emphasized. It is, therefore, not necessary to record the emphasis identification signal in each data block. Preferably, therefore, the emphasis identification signal is recorded only when the block address $[B_2B_1B_0]$ is equal to [000]. Furthermore, if the digitized information is recorded in two tracks per channel, the emphasis identification signal may be recorded only in one of such two tracks, and as before, this emphasis identification signal is recorded only when the block address in that particular track is equal to [000]. Likewise, when the digitized information is recorded in four tracks per channel, the emphasis identification signal may be recorded in only a predetermined one of those tracks and, again, only when the block address in that track is equal to [000]. Consequently, flag bits $FB_1$ and $FB_0$ may be used to represent other information, or format data, as desired, when the block address is other than [000].

Although the emphasis identification signal has been described herein as being recorded in the first data block of, for example, even-numbered sector intervals ($S_0=$"0"), the emphasis identification signal may, if desired, be recorded in the first data block in odd-numbered sector intervals ($S_0=$"1").

As illustrated in FIGS. 2D and 2E, the data synchronizing signal interval is equal to a 16-bit interval which, in turn, corresponds to an information (or parity) word duration.

The information portion of each data block is illustrated with an expanded time scale in FIG. 2F. Information words $W_1-W_{12}$ each is formed as a 16-bit word, and each is derived from a respective sample of the input analog signal. In addition to the information words $W_1-W_{12}$, each data block also includes odd and even parity words $P_O$ and $P_E$, respectively, and odd and even Q-parity words $Q_O$ and $Q_E$, respectively. The odd and even information and parity words are cross-interleaved in accordance with the techniques described in the above-referenced, incorporated patent applications. In addition, an error detecting word, such as a 16-bit CRC code word, is produced in response to the information and parity words, and also in response to the block address bits $B_0-B_2$ and the flag bits $FB_0$ and $FB_1$.

It will be appreciated that information words $W_1-W_{12}$ all are derived from the same channel. Odd-numbered and even-numbered information words are separated, and the respective parity words $P_O$, $P_E$ and $Q_O$, $Q_E$ are derived from such separated information words. For example, odd parity word $P_O$ is produced in response to the six odd-numbered information words $W_1, W_3 \ldots W_{11}$; and even parity word $P_E$ is produced in response to the six even-numbered information words $W_2, W_6 \ldots W_{12}$. The odd-numbered information and parity words are time-interleaved, and the odd parity word $Q_O$ is produced therefrom. Likewise, the even-numbered information and parity words are time-interleaved, and the even parity word $Q_E$ is produced therefrom. Then, all of these time-interleaved odd and even words are cross-interleaved to form the illustrated data block. Preferably, the parity words are positioned in the central section of the data block, and successive odd-numbered (and even-numbered) information words are spaced from each other by a maximum distance. Thus, successive odd-numbered information words $W_1$ and $W_3$ are seen to be separated by the maximum distance which can be accommodated by the data block. Likewise, successive even-numbered information words $W_2$ and $W_4$ are separated by this maximum distance. This cross-interleaved error correction encoding technique facilitates the correction of what otherwise would be considered to be "uncorrectable" errors wherein successive information words are obliterated. Since there is a low probability that, for example, information words $W_1$ and $W_3$ both will be obliterated, when only one of these words is erroneous, it may be derived by interpolation techniques from the non-erroneous information words.

From the aforementioned patent applications, it will be appreciated that information words $W_1$ and $W_2$, for example, do not correspond to adjacent samples of the input analog signal. Such adjacent samples may be represented by information words that are recorded in widely separated data blocks. This is an advantageous feature of the aforementioned cross-interleave error correction encoding technique.

FIGS. 3A–3C illustrate the relationship among the recording formats A, B and C, respectively, wherein each channel of digitized information is recorded in one data track (format A), in two data tracks (format B) or in four data tracks (format C). Thus, in format A, as shown in FIG. 3A, successive data blocks are recorded in a single data track. In format B, as shown in FIG. 3B, successive data blocks are distributed alternately between tracks A and B. In format C, successive data blocks of a single channel are distributed, sequentially, in data tracks A, B, C and D. This distribution of data blocks in respective data tracks will be described in greater detail hereinbelow.

In FIGS. 3A-3C, the expression "data sequence" refers to the successive data blocks included in a particular channel, and the expression "block address" refers to the block # in which that particular data block is recorded in a respective data track. Furthermore, the expressions "n" and "m", as used in FIGS. 3A-3C, are integers. Accordingly, it is seen that, when format A is adopted, the first data block (n) is recorded in block #0 of, for example, the first sector interval $(4m+0)$. The second data block $(n+1)$ is recorded in block #1 of this sector interval, and so on. In the second sector interval $(4m+1)$, the fifth data block $(n+4)$ is recorded in block #4, the sixth data block $(n+6)$ is recorded in block #5, and so on. At the next-following sector interval $(4m+2)$, the block addresses are seen to repeat.

When format B is adopted, the first data block (n) is recorded in block #0 of track A in the first sector interval $(4m+0)$, and the second data block $(n+1)$ is recorded in block #0 of track B in this sector interval. The third data block $(n+2)$ is recorded in block #1 of track A in this sector interval, and the fourth data block $(n+3)$ is recorded in block #1 of track B in this sector interval. This distribution of data blocks continues such that, in block #0, 1, 2, 3, 4, 5, 6 and 7 of track A, data blocks n, $n+2$, $n+4$, $n+6$, $n+8$, $n+10$, $n+12$, and $n+14$ are recorded; and in block #0, 1, 2, 3, 4, 5, 6 and 7 in track B data blocks $n+1$, $n+3$, $n+5$, $n+7$, $n+9$, $n+11$, $n+13$ and $n+15$ are recorded. It is seen that these block addresses repeat at the commencement of sector interval $4m+2$.

When format C is adopted, as shown in FIG. 3C, the successive data blocks are distributed in tracks A, B, C and D. Thus, the first data block (n) is recorded in block #0 of track A, the second data block $(n+1)$ is recorded in block #0 of track B, the third data block $(n+2)$ is recorded in block #0 of track C and the fourth data block $(n+3)$ is recorded in block #0 of track D. This sequence of data block distributions continues, so as to record the data blocks in respective block numbers of tracks A-D, respectively, as illustrated. Upon the occurrence of sector interval $4m+2$, the block addresses in each of tracks A-D repeat.

The foregoing may be summarized, when the record medium is, for example ¼ inch width tape, as follows:

| Data Track | Format A | Format B | Format C |
| --- | --- | --- | --- |
| $TD_1$ | CH1 | CH1-A | CH1-A |
| $TD_2$ | CH2 | CH2-A | CH2-A |
| $TD_3$ | CH3 | CH3-A | CH1-C |
| $TD_4$ | CH4 | CH4-A | CH2-C |
| $TD_5$ | CH5 | CH1-B | CH1-B |
| $TD_6$ | CH6 | CH2-B | CH2-B |
| $TD_7$ | CH7 | CH3-B | CH1-D |
| $TD_8$ | CH8 | CH4-B | CH2-D |

In the foregoing, it is seen that, when format B is adopted, the first data block (A) for channel 1 (CH1) is recorded in data track $TD_1$, and the second data block (B) of channel 1 (CH1) is recorded in data track $TD_5$. A similar distribution occurs for channels 2-4.

When format C is adopted, the first data block (A) of channel 1 (CH1) is recorded in data track $TD_1$, the second data block (B) of channel 1 (CH1) is recorded in data track $TD_5$, the third data block (C) of channel 1 (CH1) is recorded in data track $TD_3$, and the fourth data block (D) of channel 1 (CH1) is recorded in data track $TD_7$. A similar distribution of successive data blocks A, B, C and D for channel 2 is recorded in data tracks $TD_2$, $TD_6$, $TD_4$ and $TD_8$, respectively.

The foregoing track assignments advantageously simplify the manner in which data is distributed or recovered for the different formats which may be used.

FIG. 4 schematically illustrates one example of the recording transducers, or heads, which are used for recording digitized information in the respective data tracks, as well as for recording the control signal in control track TC. The arrangement shown in FIG. 4 is particularly adapted to enable the information recorded in one track to be re-recorded in another track; and also to enable electronic editing, wherein information from a separate source, such as another record medium, is inserted into one or more desired data tracks at punch-in points. For the embodiment shown in FIG. 4, magnetic tape 1 is assumed to be driven in the direction indicated by the arrow.

The heads of FIG. 4 are comprised of a set of recording heads HR, a set of reproducing, or playback heads HP and another set of recording heads HR'. Each set of heads is comprised of aligned heads which are used for recording or reproducing information in respective data tracks TD, and also the control head for recording or reproducing the control signal in control track TC. Thus, recording heads HR actually are comprised of separate recording heads $HR_1$-$HR_8$ together with control signal recording head $HR_C$, all aligned across the width of tape 1. Likewise, additional recording heads HR' actually are comprised of recording heads $HR'_1$-$HR'_8$ and control signal recording $HR'_C$.

Recording heads HR are used to record original information in the respective data and control tracks of tape 1. For example, these heads may be used to form an original recording. The information recorded in these tracks are reproduced by associated ones of reproducing heads HB. When information recorded in one or more tracks is to be edited, that is, this information is to be modified or replaced by additional information, recording heads HR' are operated, selectively, to record such additional information in the appropriate tracks. For example, in format A, the digitized information recording in track $TD_1$ may be edited by locating the desired punch-in point and then, when that punch-in point reaches recoding head $HR'_1$, the new information is recorded in data track $TD_1$. When the desired punch-out point is reached, recording head $HR'_1$ is disabled. Likewise, when information record in one channel, or one track, is to be re-recorded in another channel, or track, the information from the first channel, or track, is reproduced by the appropriate ones of reproducing heads HP, and that reproduced information then is supplied to the desired ones of recording heads HR' for re-recording in the appropriate tracks. The combination of heads HP and HR' may be used for so-called "sync" recording wherein one channel is recorded while another channel is reproduced. It will be appreciated that, even when the foregoing edit operations or "sync" recording is carried out, the control track is not modified.

Typical examples of electronic editing which may be used with the arrangement of the transducers shown in FIG. 4 are described in U.S. application Ser. No. 116,401, filed Jan. 29, 1980, and also in U.S. Ser. No. 195,625, filed Oct. 9, 1980, both of these applications being incorporated herein by reference.

Turning now to FIG. 5, there is illustrated a block diagram of one embodiment of apparatus which may be used to record digitized information in a selected one of various different formats. This digitized information may represent digital audio signals, such as PCM audio signals, which have been converted into digital form in accordance with a selected sampling rate $f_s$, and which have been selectively emphasized in accordance with a conventional emphasis circuit.

The illustrated recording apparatus is adapted to receive up to eight channels of digitized information, and to record the received channels of information in respective data tracks. As mentioned above, the number of tracks in which each channel of information is recorded is dependent upon the selected format. Accordingly, the illustrated apparatus is provided with eight input terminals $2a \ldots 2h$, each adapted to receive a respective channel of digitized information CH1 ... CH8, respectively. Input terminals $2a$–$2h$ are coupled to encoders $3a$–$3h$, respectively.

Each encoder may be of the cross-interleaved error correction type described hereinabove or, alternatively, the encoders may be adapted to encode the digitized information in other error correction encoding schemes. Each encoder may be operable in accordance with different formats such that a particular encoding scheme is adopted in accordance with a format identifying signal supplied thereto. For this purpose, an additional input terminal $4a$ is provided to receive a format control signal which may be generated by, for example, an operator of the illustrated apparatus.

In order to simplify the present description, it is assumed that only one type of encoding scheme is used, such as the aforementioned cross-interleaved error correction code. Thus, regardless of the format which is selected, this same encoding scheme will be employed to encode each channel of digitized information. However, it is contemplated that different encoding schemes may be used to accommodate different formats. The particular encoding scheme which is selected, that is, the particular mode of operation of the illustrated encoders, is dependent upon the format control signal supplied to such encoders from input terminal $4a$.

The encoded digitized information produced by encoders $3a$–$3h$ are supplied to respective inputs of a demultiplexor 6. This demultiplexor is adapted to distribute the digitized information supplied to the respective inputs thereof to preselected outputs, depending upon the particular format which has been selected. In this regard, demultiplexor 6 is coupled to a controller 7 which, in turn, is coupled to input terminal $4a$ to receive the format control signal.

In one embodiment the demultiplexor includes a set of switching circuits, the operation of which is controlled by controller 7. For example, if the format control signal supplied to input terminal $4a$ identifies format A, controller 7 controls the switching circuits of demultiplexor 6 such that the digitized information supplied to each input of the demultiplexor from encoders $3a$–$3h$, respectively, is coupled to a corresponding respective output. That is, each channel of digitized information is distributed to only a single output of demultiplexor 6. If, however, the format control signal supplied to input terminal $4a$ identifies format B, controller 7 controls demultiplexor 6 to distribute each channel of digitized information supplied to a respective input to two outputs. In this regard, only four channels (CH1–CH4) of digitized information are supplied to the illustrated recording apparatus. Each channel is distributed to two respective outputs of the demultiplexor in accordance with the foregoing table. Likewise, if the format control signal supplied to input terminal $4a$ identifies format C, controller 7 controls the switching circuits of demultiplexor 6 such that each channel of digitized input information supplied to the demultiplexor is distributed to four respective outputs. When format C is adopted, it is appreciated that only two channels (CH1 and CH2) of digitized information are supplied to the illustrated recording apparatus. Demultiplexor 6 is controlled so as to distribute these channels of digitized information in the manner summarized by the foregoing table.

In the foregoing description, it should be recognized that the digitized information supplied to each input of demultiplexor 6 is encoded in, preferably, the cross-interleaved error correction code by encoders $3a$–$3h$, respectively. Thus, a particular input of the demultiplexor is supplied with consecutive data blocks of the type shown in FIG. 2F, each data block having been formed in the manner described in the aforementioned, incorporated patent applications.

The outputs of demultiplexor 6, which also may be referred to as a distributor circuit, are coupled to modulators $8a$–$8h$, respectively. Each modulator may be of the type described in aforementioned application Ser. No. 222,278. Although not shown herein, each modulator alternatively may be adapted to operate in different modes of operation so as to carry out different types of modulation. The particular type of modulation which is adopted is dependent on and controlled by the format control signal supplied to input terminal $4a$. Thus, depending upon the particular format which is adopted by the operator, a corresponding type of modulation is effected.

The outputs of modulators $8a$–$8h$ are coupled to data recording heads HR1–HR8 via recording amplifiers $9a$–$9h$ to be recorded in data tracks $TD_1$–$TD_8$, respectively. Thus, each received channel of digitized information is recorded in the selected format on, for example, magnetic tape. That is, a selected encoding scheme, type of modulation, tape speed and number of tracks per channel are adopted in accordance with the particular format which is used.

FIG. 5 also illustrates a control channel whereby the control signal shown in FG. 2B is produced, modulated and recorded in a separate control track TC. The control channel is coupled to input terminal $4a$ and also to additional input terminals $4b$ and $4c$. Input terminal $4b$ is adapted to receive a sampling identification signal which identifies, or represents, the particular sampling rate $f_s$ which has been used to digitize the original input analog information. Input terminal $4c$ is adapted to receive an appropriate clock signal for synchronizing the operation of the control channel. These input terminals $4a$, $4b$ and $4c$ are connected to a control signal encoder 5 which, for example, includes a control word generator responsive to the format control signal and the sampling identification signal to produce the aforementioned control word comprised of control bits $C_0$–$C_{15}$. The control signal encoder also includes a synchronizing signal generator for generating the preamble and synchronizing pattern shown in FIG. 2A in response to the clock signal supplied to input terminal 4c. In addition, the control signal encoder includes a sector address generator which, preferably includes a multi-bit binary counter, such as a 30-bit counter. Also included in control signal encoder 5 is a CRC word generator which may be of a conventional type and which is supplied with the generator control word and sector address to produce an appropriate CRC word.

The control signal produced by control encoder 5 and which may be of the type shown in FIG. 2B, is coupled to control recording head $HR_C$ via an FM modulator 10 and a recording amplifier 11. It is preferred to record the control signal as a frequency-modulated signal so as to facilitate the reproduction and detection thereof for all formats. That is, even though the tape speed may differ from one format to another, the frequency-modulated control signal may, nevertheless, be accurately detected.

Although not shown in FIG. 5, each of the encoders 3a–3h includes a data synchronizing signal generator for generating the data synchronizing signal illustrated in FIGS. 2D and 2E. That is, the particular synchronizing pattern shown in FIGS. 2D and 2E is generated by each encoder. Furthermore, each encoder is adapted to supply the block address $[B_2B_1B_0]$ for identifying the particular blocks which are recorded in each sector interval in each data track. This block address is derived from, for example, the three least significant bits included in the 30-bit counter of encoder 5. Thus, this 30-bit counter is seen to generate both the sector address and the block address. Hence, this counter may be incremented in synchronism with the generation, or formation, of each data block produced by encoders 3a–3h. It is appreciated that, after four data blocks have been generated, the two least significant bits of the 30-bit counter repeat their cycle. Likewise, after eight data blocks have been generated, the three least significant bits of the 30-bit counter are repeated. Hence, the aforementioned block and sector addresses are generated by this 30-bit counter.

From the foregoing, it is appreciated that the same block address is recorded for each data block that is recorded in the same relative position in a sector interval in each of the plural data tracks. That is, if format A is adopted, then the same sequential block addresses [000], [001], [010], . . . [111] are supplied to each encoder 3a–3h to be added to each data block generated thereby. Alternatively, if format B is adopted, then, for the first two data blocks generated by, for example, encoders 3a–3d, the block address [000] is added thereto. Hence, although eight data blocks are recorded, representing digitized information in four channels, all eight of these data blocks exhibit the same block address [000]. Then, for the next two data blocks produced by each of encoders 3a–3d, the block address supplied to such encoders is equal to [001]. This block address generation continues, wherein the same block address is added to every two data blocks generated by each encoder.

If format C is adopted, it is appreciated that the same block address, as generated by the 30-bit counter included in encoder 5, is supplied to, for example, encoders 3a and 3b, for four successive data blocks generated thereby. It is appreciated that these four data blocks generated by, for example, encoder 3a, all are encoded in substantial alignment in the same sector interval in, for example, data tracks $TD_1$, $TD_5$, $TD_3$ and $TD_7$, respectively. Each of these data blocks will be provided with the block address [000]. Likewise, for the first four data blocks generated by encoder 3d, the same data block address [000] will be added to those four data blocks which are recorded in data tracks $TD_2$, $TD_6$, $TD_4$ and $TD_8$, respectively. Of course, these four data blocks will exhibit substantial alignment in the same sector interval.

Thus, those data blocks which are located in the same relative position in a sector interval in all of the data tracks contain the same block address from one data track to another. The first data block recorded in all of the tracks, regardless of the format, includes the block address [000], the second data block in each of these tracks, regardless of the particular channel from which that data block is derived, contains the block address [001], and so on.

It is appreciated that the 30-bit counter included in encoder 5 which is used to generate the sector and block addresses may be incremented by a clock signal supplied thereto, which signal has a period equal to a block period and which is in synchronism with the digital signals that are applied to input terminals 2a–2h.

Although not shown herein, each of encoders 3a–3h also may include an emphasis identification generator for generating the emphasis identification signal $FB_1FB_0$, described above.

It will be appreciated that the timing of the encoders is a function of the particular format which has been adopted. In this regard, a suitable timing control circuit, including an adjustable clock generator, may be provided in each encoder, the operation of each timing control circuit being controlled, or changed over, in response to the format control signal supplied to input terminal 4a. Thus, proper timing of the encoded digitized information is achieved so as to be consistent with the selected format.

Referring now to FIG. 6, there is illustrated a block diagram of reproducing apparatus for reproducing the digitized information from respective tracks of the record medium, which apparatus is compatible with any one of the particular formats which may be used to record that information. This embodiment of the data reproducing apparatus is comprised of reproducing heads $HP_1$–$HP_8$ adapted to reproduce the digitized information which had been recorded in data tracks $TD_1$–$TD_8$, respectively. Heads $HP_1$–$HP_8$ are coupled to demodulators 16a–16h via playback amplifiers 12a–12h and clock signal extracting circuits 14a–14h, respectively. Each clock signal extracting circuit includes a phase-locked loop for generating a clock signal of desired repetition rate, which phase-locked loop is synchronized with, for example, the bit timing rate, or phase, of the reproduced digital signals. The synchronizing pattern recorded in the respective data tracks at the head of each data block may be used to synchronize the phase-locked loop. Hence, the bit timing, or clock signals, are extracted from the data which is reproduced from each track.

Each demodulator is adapted to be compatible with the particular type of modulation which had been used to record the digitized information. Consequently, each demodulator may include selectable demodulator circuitry responsive to a format identification signal (such as represented by control bits $C_0$–$C_{15}$ of the recorded control signal) to select the appropriate demodulating circuitry.

Demodulators 16a–16h are coupled to respective inputs of a multiplexor 21 via time base error correctors 22a–22h, respectively. Multiplexor 21 is controlled by a suitable controller 20, this controller being responsive to a decoded format identification signal for establishing the appropriate switching sequences for the multiplexor. The outputs of multiplexor 21 are coupled to decoders 24a–24h, respectively, which decoders may be of the type described in the aforementioned incorporated patent applications adapted to decode, for example, the preferred cross-interleaved error correction code which had been used to record the digitized information. The outputs of decoders 24a–24h are coupled to output terminals 25a–25h, respectively, so as to recover the original channels of digitized information CH1–CH8, respectively.

The reproducing apparatus shown in FIG. 6 also includes a control channel adapted to recover the control signal (FIG. 2B) which had been recorded in control track TC. In this regard, the control channel includes a control reproducing head $HP_C$ coupled to an FM demodulator 17 via a playback amplifier 13 and a clock signal extracting circuit 15. This clock signal extracting circuit may be similar to any one of aforedescribed clock signal extracting circuits 14a–14h. The FM demodulator is adapted to demodulate the control signal which had been frequency modulated prior to recording. This demodulated control signal then is supplied to an error-detecting circuit 18, such as a CRC check circuit, which operates in a known manner in response to the CRC code word included in the control signal for the purpose of detecting whether an error is present in the control signal. That is, CRC check circuit 18 detects whether the control word $C_0$–$C_{15}$ or the sector address $S_0$–$S_{27}$ contains an error. If no error is detected, the control signal is supplied to a decoder 19 which operates to recover the control word ($C_0$–$C_{15}$), the sector address and the synchronizing pattern included in the control signal. However, if an error is detected in the reproduced control signal, an immediately preceding control word, which had been stored to account for the possibility that the next-following control signal may be erroneous, is used. In this regard, a delay circuit having a time delay equal to one sector interval may be provided in, for example, decoder 19.

The recovered control word ($C_0$–$C_{15}$) is supplied to controller 20 to establish the particular switching arrangement for multiplexor 21, by which the digitized information which is reproduced from data tracks $TD_1$–$TD_8$ is re-distributed, or re-formed, back to the proper channels. This control word also is supplied to decoders 24a–24h to select the appropriate decoding scheme which is compatible with the particular encoding scheme which had been used for recording the digitized information. Also, depending upon the number of tracks per channel which had been used for recording, the timing control of the decoders may be adjusted to be compatible therewith, the number of tracks per channel being represented, of course, at least by control bits $C_9$–$C_{11}$. Also, the sampling identification data, comprised of bits $C_{12}$–$C_{15}$, may be used by digital-to-analog circuitry (not shown) so as to recover the original analog signal in each channel.

Preferably, the reproducing apparatus illustrated in FIG. 6 recovers the original digitized information, which information then is supplied to suitable converting circuitry for converting the digital signals back to their original analog form. For example, if the illustrated apparatus is used as a so-called PCM audio recorder, the digitized information produced at the outputs of decoders 24a–24h is in the form of PCM signals, and each PCM signal is converted into a corresponding analog level so as to re-form the original analog audio signal.

Decoder 19 also recovers the control synchronizing signal (FIG. 2A) and the sector address $S_0$–$S_{27}$ included in each reproduced control signal. This control synchronizing signal, which exhibits a repetition rate determined by the sector interval, is supplied to a servo circuit for the tape-drive capstan to effect control over that capstan such that the record tape is driven uniformly for the reproducing operation. The sector address is used to identify a particular sector interval in which a desired data block is recorded, thereby enabling precise punch-in and punch-out points to be accessed for an edit operation. The sector address also may be used to locate desired data recorded in any one or more of data tracks $TD_1$–$TD_8$.

Each of time base correctors 22a–22h is adapted to correct time base errors which may be introduced into the digitized information in one or more data tracks during reproduction. Such time base errors may be due to tape jitter, expansion (or contraction) of the tape after data has been recorded thereon, or a disturbance in the normal synchronous relationship between the data and control tracks due to, for example, editing of only one (or less than all) channel. Each time base corrector preferably includes an addressable memory device, such as a random access memory (RAM) whose capacity is at least equal to a sector interval (i.e. four data blocks) and, desirably, has a memory capacity adequate to account for maximum time base variations that may be expected. Typically, a memory capacity capable of storing eight data blocks is sufficient.

Each data block is written into the RAM of a respective time base corrector, word-by-word, in response to the extracted clock signal derived from the reproduced signal. Hence, as in conventional time base correctors, the reproduced data is written into the RAM in synchronism with the time base variations that may be present in the reproduced signals. The time base correctors are coupled in common to a read clock terminal 23 adapted to be supplied with a read clock signal of fixed, reference frequency. Accordingly, each data block is read out of the RAM at a constant reference rate, thereby eliminating therefrom the time base variations that may have been present during reproduction.

The particular location in the RAM of the time base corrector in which a demodulated data block is written is a function of the block address [$B_2B_1B_0$] included in that data block. However, in the event of what may be viewed as severe time base errors caused by, for example, editing, the data blocks recorded in the edited track may be skewed relative to the remaining tracks, and particularly with respect to control track TC. Nevertheless, this skew is eliminated by time base correctors 22a–22h. In particular, the coincidence between the most significant bit $B_2$ of the block address and the least significant bit $S_0$ of the sector address permits each skewed data block to be written into the proper location of the RAM, provided this skew is less than a full sector interval. This is better explained by referring to FIGS. 7A–7D.

FIG. 7A is a waveform diagram of the least significant bits $S_0$ of the sector address included in each periodic control signal. It is seen that this least significant bit changes over from one logical sense, or state, to the other at the sector period. FIG. 7B illustrates the waveform of the most significant bit $B_2$ in each block address in the absence of any skew between the data track in which this block address is recorded and the control track. It is seen that the block addresses corresponding to sector #n are, indeed, present when sector address #n is reproduced from the data track. That is, least significant bit $S_0$ and most significant bit $B_2$ are in phase with each other.

Let it be assumed that the data recorded in the data track under discussion is subjected to a time base error so as to impart skew thereto relative to the control track. FIG. 7C represents this skew in the positive direction wherein the data track leads the control track. That is, the most significant block address bit $B_2$ leads the least significant sector address bit $S_0$ such that the data blocks recorded in sector #n are reproduced almost (but less than) a full sector interval before sector #n is reproduced from the control track. Alternatively, FIG. 7D represents this skew to be in the negative direction wherein the data track lags the control track. That is, the most significant block address bit $B_2$ lags the least significant sector address bit $S_0$ such that the data blocks recorded in sector #n are reproduced almost a full sector interval after sector #n is reproduced from the control track. Nevertheless, in both FIGS. 7C and 7D, the most significant block address bit $B_2$ undergoes a transition, shown as the negative transition associated with sector #n, that is less than a full sector interval from the corresponding negative transition of the least significant sector address bit $S_0$. Since the state of the most significant block address bit ($B'_2$ or $B''_2$) thus will coincide, at least briefly, with the most significant sector address bit $S_0$, even during this skewed relationship between the data and control tracks, the block address associated with sector #n, that is, the block addresses that had been recorded in sector #n, can be readily discriminated. Accordingly, the correct data blocks, as identified by these block addresses, will be written into the appropriate location of the RAM. Consequently, when these data blocks are read out of the RAM at the fixed read-out clock rate the aforementioned skew will be cancelled.

As described above, the data blocks read out of time base correctors 22a–22h are supplied to multiplexor 21 which operates to recover each channel of digitized information from the respective data tracks in which those channels were recorded. For example, if the digitized information had been recorded in format A, then multiplexor 21 supplies the successive data blocks which are applied thereto from time base correctors 22a–22h (as derived from data tracks $TD_1$–$TD_8$) to decoders 24a–24h, respectively. Alternatively, if the digitized information had been recorded in format B, then multiplexor 21 supplies the successive data blocks which are applied thereto from time base correctors 22a and 22e to decoder 24a, the successive data blocks which are applied thereto from time base correctors 22b and 22f to decoder 24b, and so on. Likewise, if the digitized information had been recorded in format C, then multiplexor 21 supplies the successive data blocks which are applied thereto from time base correctors 22a, 22e, 22c and 22g to decoder 24a, and the successive data blocks which are applied thereto from time base correctors 22b, 22f, 22d and 22h to decoder 24b. The multiplexor may be of complementary construction to that of demultiplexor 6 (FIG. 5).

The decoders include CRC check circuits to detect if an error is present in each data block applied thereto (by conventional CRC-check techniques), de-interleaving circuits to de-interleave the digital words which constitute the respective data blocks, error-correction circuits to correct errors that may be present in the de-interleaved words (by using the Q- and P-parity words in known manner), and interpolating circuits to compensate, or conceal, those errors which might not be correctable (by using interpolating techniques of the type described in those applications which are incorporated herein by reference). The resultant data words produced at output termminals 25a–25h may be PCM audio signals which are converted into analog form by digital-to-analog converters (not shown) coupled to such output terminals.

While the present invention has been particularly shown and described with reference to preferred embodiments herein, various changes and modifications in form and details may be readily apparent to those of ordinary skill in the art without departing from the spirit and scope of the invention. For example, a separate synchronizing pattern need not be included as part of the control signal recorded in control track TC. Rather, a portion of the sector address, such as the beginning portion thereof, may perform the same function, and thus may be used as, the control synchronizing signal. As another example, the two least significant bits of the sector address may coincide with the two most significant bits of the data block address. As mentioned above, such coincidence permits the proper data block to be identified, even in the presence of severe skew between the data and control tracks, thereby enabling correct data blocks to be written into corresponding locations of the time base correctors. It is intended that the appended claims be interpreted as including the foregoing as well as other such changes and modifications.

What is claimed is:

1. A method of recording at least one channel of digitized information in at least one data track on a record medium, comprising the steps of:

generating data blocks in response to said digitized information, each data block containing a predetermined number of data words representing said digitized information;

generating a block address for identifying each said data block, and adding said block address to the data block identified thereby;

recording successive data blocks, including the block addresses added thereto, in said at least one data track;

generating a periodic control signal during successive sector intervals, said periodic control signal including at least a synchronizing signal and a sector address; and recording said control signal in a control track to define successive sector intervals on said record medium;

whereby a multiple of data blocks is recorded in said at least one data track during each sector interval.

2. The method of claim 1 wherein said block address is comprised of plural bits and said sector address is comprised of a multiple of bits, the least significant bit of said sector address being coincident with the most significant bit of said block address.

3. The method of claim 2 wherein said sector address is formed of a substantially greater number of bits than said block address.

4. The method of claim 1 wherein said step of generating a periodic control signal includes generating said sector address by incrementing the previous sector address by unity substantially at the beginning of each sector interval and wherein said step of generating a block address comprises incrementing the previous block address by unity at each data block, and repeating said block addresses in successive sector intervals.

5. The method of claim 1 wherein said at least one channel of digitized information is recorded in plural data tracks by distributing said data blocks to said plural data tracks, each data track containing said multiple of data blocks during each said sector interval; and wherein said step of generating a block address comprises generating the same block address for each data block that is recorded in the same relative position in a sector interval in each of said plural data tracks.

6. The method of claim 1 wherein said step of generating a periodic control signal includes generating a predetermined control synchronizing pattern, and locating said control synchronizing pattern at a predetermined position in said periodic control signal.

7. The method of claim 6 wherein said predetermined position in said periodic control signal is the beginning portion thereof.

8. The method of claim 1 wherein said step of recording a block address comprises recording said block address in advance of the data block identified thereby.

9. The method of claim 8 wherein said step of generating data blocks includes generating a predetermined data synchronizing signal, and locating said data synchronizing signal at a predetermined position in each said data block.

10. The method of claim 9 wherein said predetermined position is in advance of said block address.

11. A method of recording n channels of digitized information in m data tracks on a record medium wherein each channel is recorded in m/n data tracks (m≧n, and m and n are integers), said method comprising the steps of:
encoding the digitized information in each channel to form successive data blocks, each data block being comprised of plural data words representing said digitized information;
distributing successive m/n data blocks for recording in respective ones of said m/n data tracks;
generating a respective block address for each of the data blocks recorded in a respective track, said block address being incremented for each data block to be recorded in a data track, and said block address being repeated after a predetermined number of sector intervals are recorded, a multiple of data blocks being recorded in a data track in a sector interval;
recording said multiple of data blocks, including the block addresses generated therefor, in each sector interval in each of said m data tracks;
generating a periodic control signal during successive sector intervals, said periodic control signal including a sector address that is incremented for each control signal to be recorded so as to provide substantially non-repeating sector addresses, at least the least significant bit of said sector address being of the same logical sense as at least the most significant of the block addresses recorded in the same sector interval as said control signal; and
recording said periodic control signal in respective sector intervals in a control track that is separate from said data tracks.

12. The method of claim 11 wherein each channel of digitized information represents a channel of analog audio signals.

13. The method of claim 12 wherein the plural data words included in a data block comprise PCM words.

14. The method of claim 11 wherein said n channels of digitized information are recorded in a selected format; and wherein said step of generating a periodic control signal includes generating control data representing the selected format, said control data being included with said sector address in said control signal.

15. The method of claim 14, wherein said step of generating a periodic control signal further includes generating an error detecting code as a function of said control data and said sector address, said error detecting code being included in said control signal for detecting, upon the reproduction of said control signal, an error therein.

16. The method of claim 14 wherein said step of generating a periodic control signal further includes generating a predetermined control synchronizing pattern, and inserting said control synchronizing pattern at the beginning portion of said control signal, whereby said control synchronizing pattern has a repetition rate that is the inverse of said sector interval.

17. Apparatus for recording digitized information of at least one channel in at least one data track on a relatively movable record medium, comprising:
encoding means receiving said at least one channel and generating therefrom successive data blocks adapted to be recorded, each data block including a plurality of data words representing said digitized information; said encoding means also generating block addresses to identify respective ones of said data blocks to be recorded;
recording transducer means for recording the data blocks generated from said at least one channel, together with said generated block addresses, in said at least one data track, a predetermined number of successive data blocks being recorded in said at least one data track in a sector interval;
control signal generating means for generating a control signal for recording in a respective sector interval, said control signal including at least a sector address for identifying said sector interval; and
control recording transducer means for recording said control signal in a sector interval in a control track parallel to said at least one data track.

18. The apparatus of claim 17 wherein said sector address is comprised of a multiple of bits and said block address is comprised of a plurality of bits of lesser number than said sector address; and wherein at least the least significant bit of said sector address is equal, in logical sense, to at least the most significant bit of said block address.

19. The apparatus of claim 18 further comprising multi-bit counting means incremented when a data block adapted to be recorded is generated, a predetermined number of the bits of greater significance of said counting means comprising said sector address, and a smaller predetermined number of the bits of lesser significance of said counting means comprising said block address, wherein a common bit is included in both said sector address and said block address.

20. The apparatus of claim 19 wherein said at least one channel of digitized information is recorded in plural parallel data tracks, each data track having successive data blocks therein with said data blocks located in the same relative position in all of said data tracks, relative to said sector interval, containing the same block addresses from one data track to another; and said encoding means further includes distributing means for distributing cosecutive ones of the generated data blocks to respective ones of said data tracks.

21. The apparatus of claim 17 wherein said control signal generating means includes synchronizing pattern generating means for generating a control synchronizing pattern located at a predetermined position in said control signal.

22. The apparatus of claim 21 wherein said control synchronizing pattern is located at the beginning portion of said control signal, such that the period of said control synchronizing pattern is equal to said sector interval.

23. The apparatus of claim 17 wherein said encoding means includes means for generating a data synchronizing signal in advance of said block address, such that the period of said data synchronizing signal is equal to the interval defined by a data block.

24. The apparatus of claim 17 wherein said encoding means is selectively operative to encode said at least one channel of digitized information in one of plural formats; and wherein said control signal generating means includes means for generating format identification data for identifying the selected format in which said at least one channel of digitized information is encoded, and means for adding said format identification signal to the control signal which is recorded.

* * * * *